Feb. 21, 1933.  W. E. WUNDERLICH  1,898,281
CONVEYING MECHANISM
Filed May 28, 1930   5 Sheets-Sheet 5
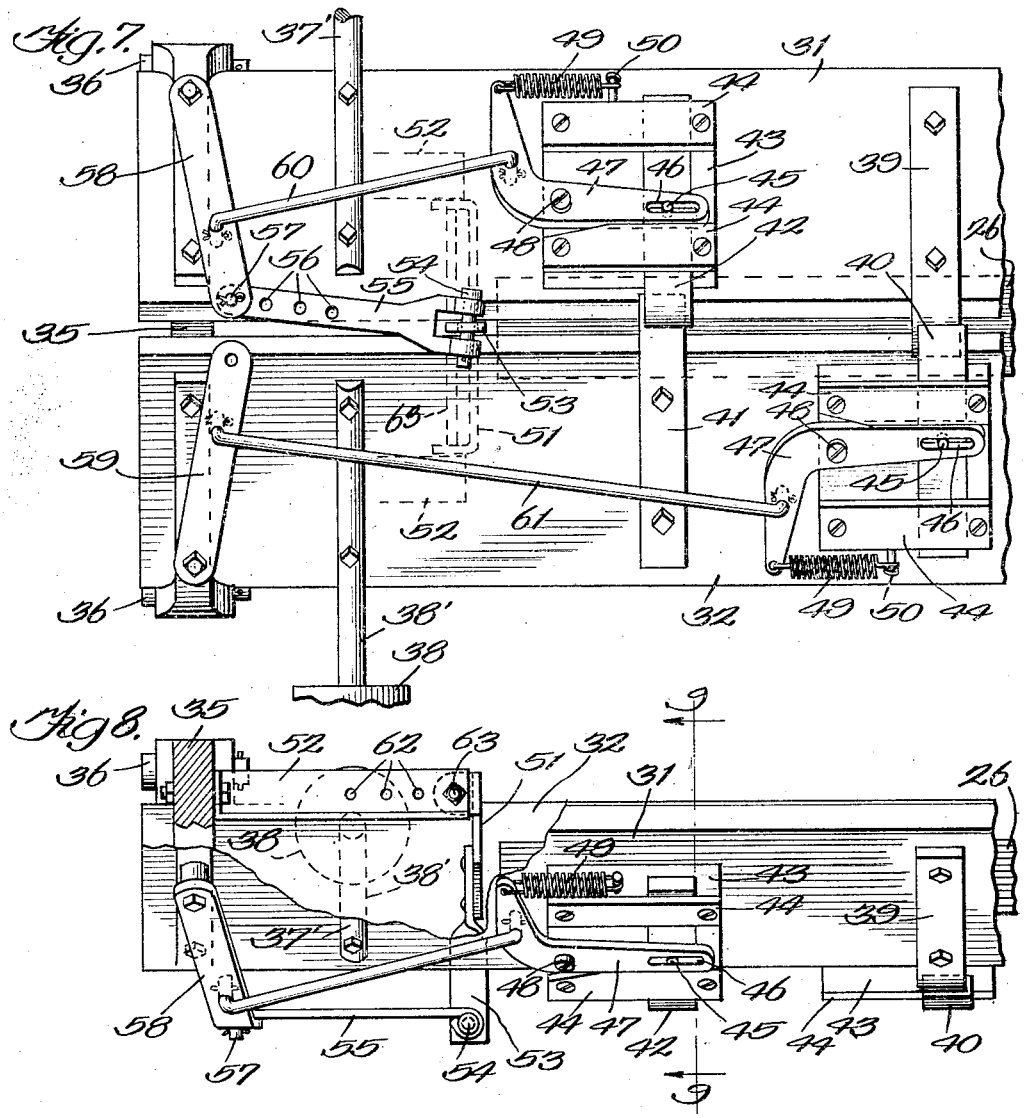

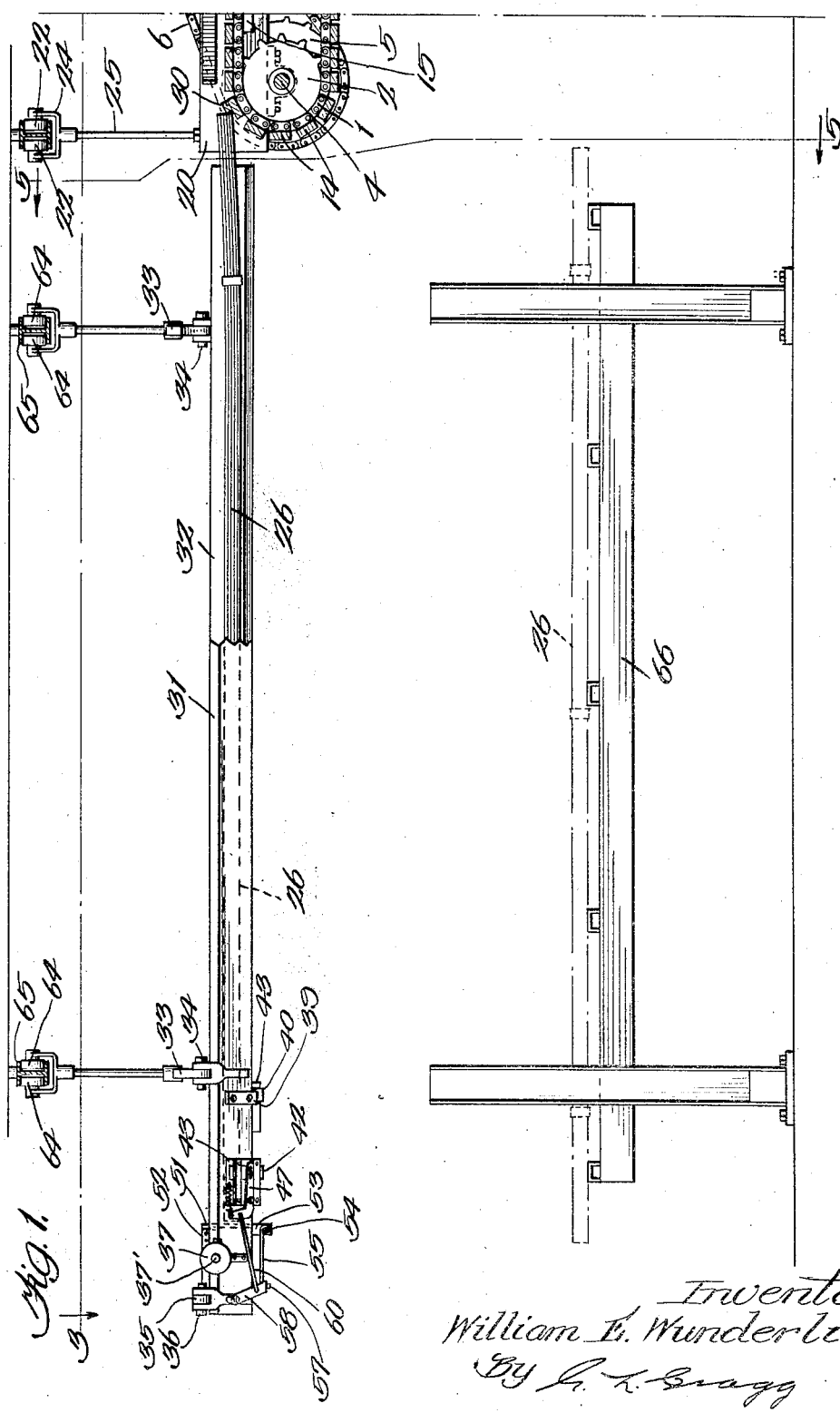

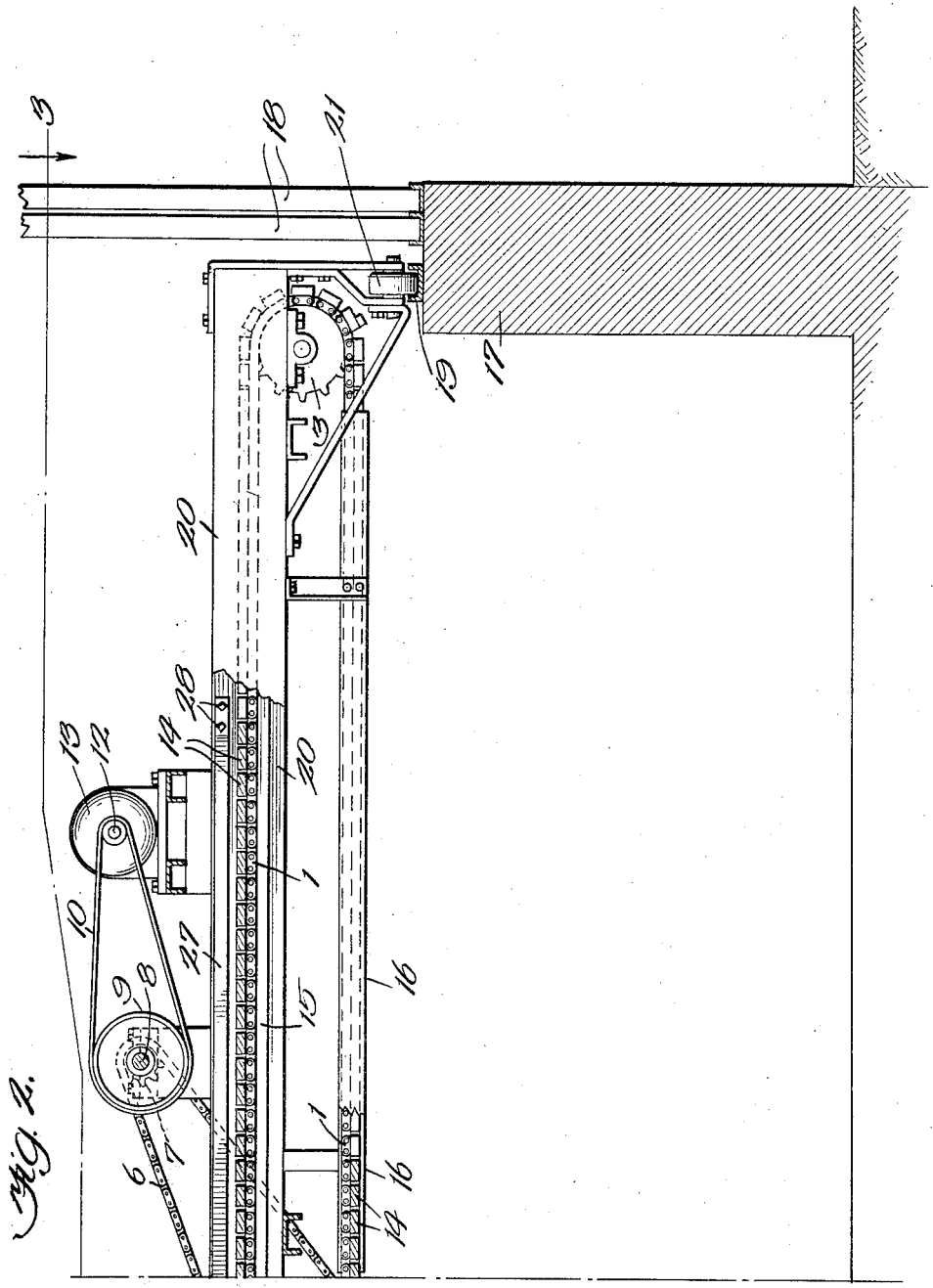

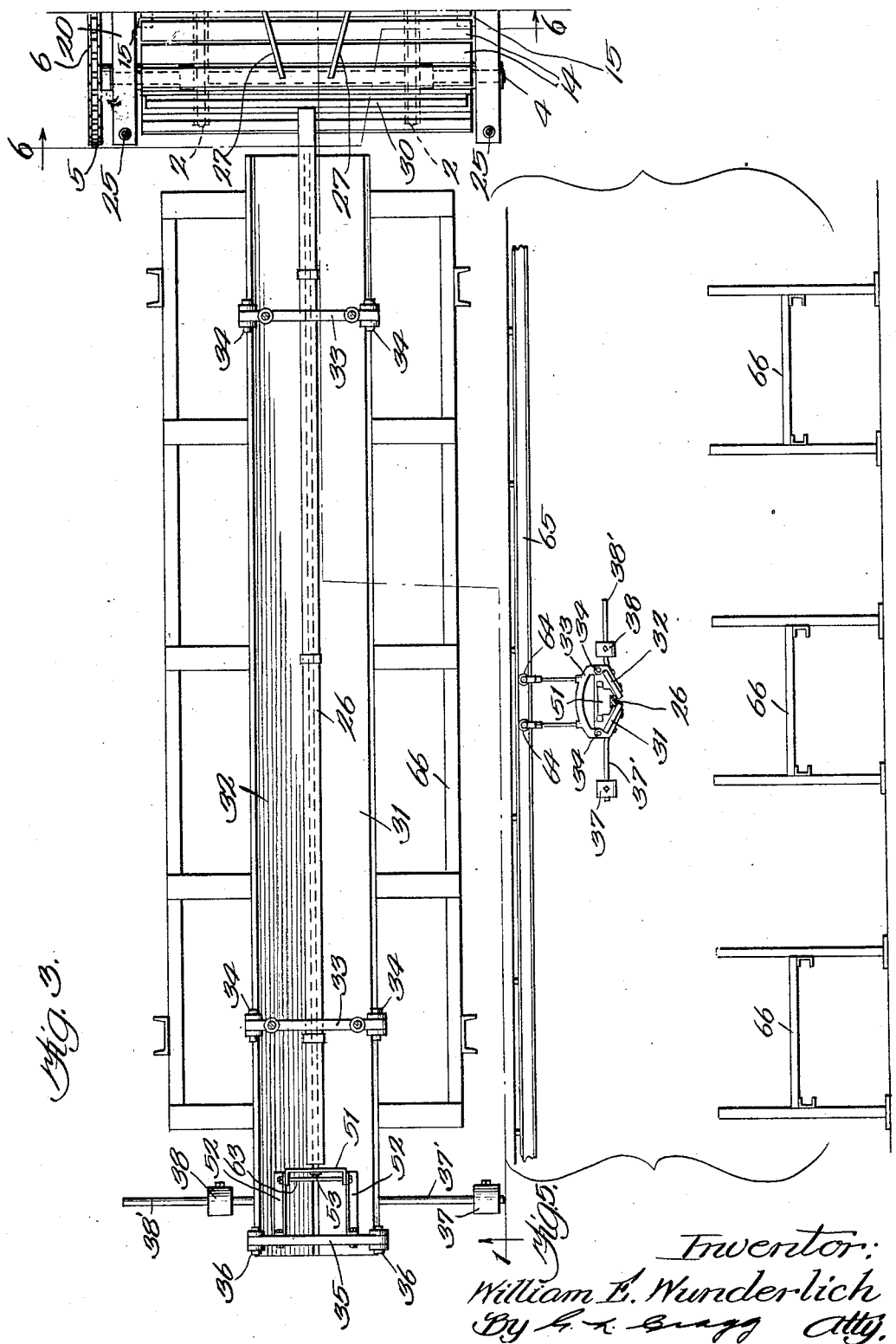

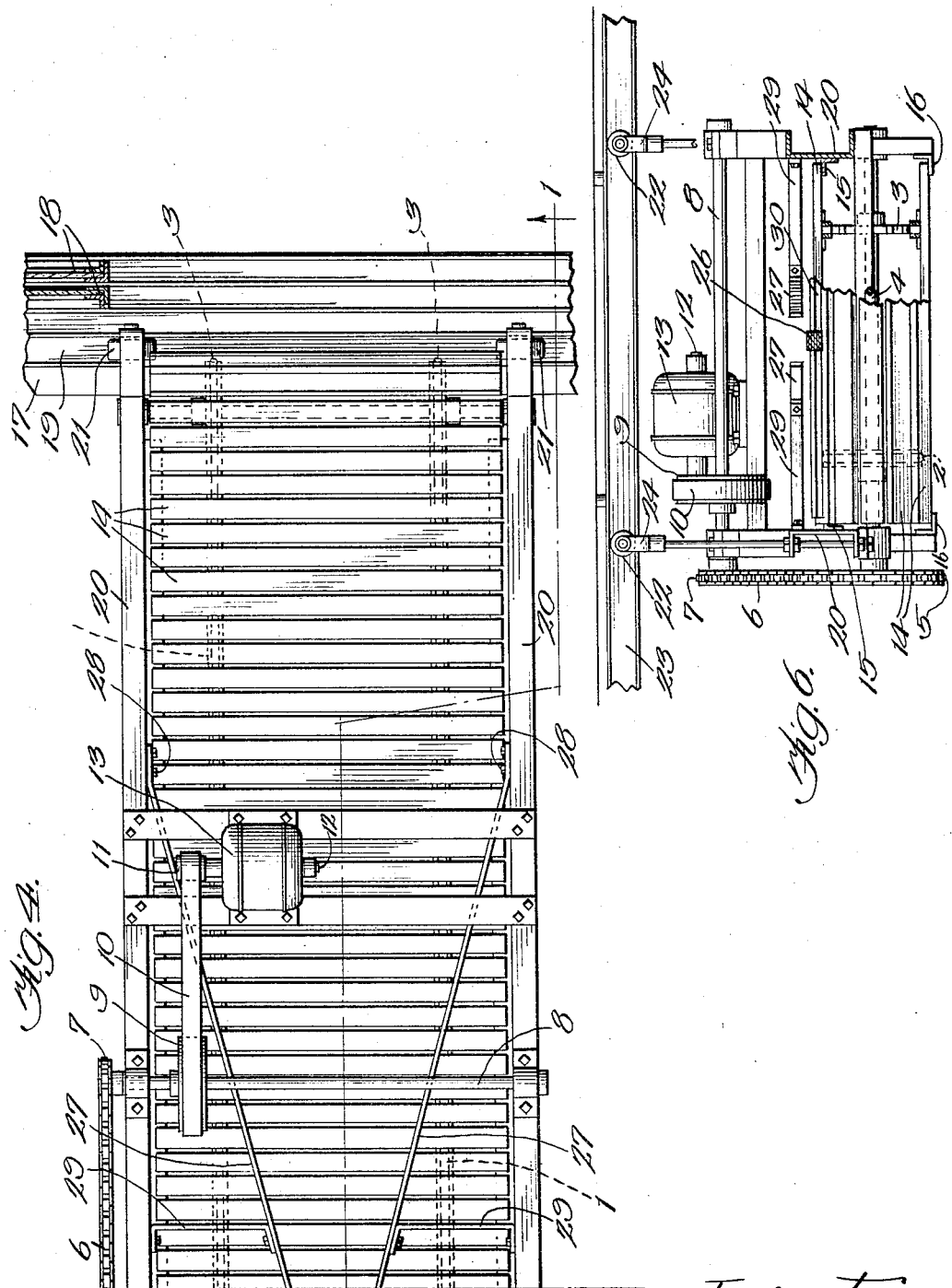

Patented Feb. 21, 1933

1,898,281

UNITED STATES PATENT OFFICE

WILLIAM E. WUNDERLICH, OF MUNCIE, INDIANA, ASSIGNOR TO THE MOORE COMPANY, OF MUNCIE, INDIANA, A CORPORATION OF INDIANA

CONVEYING MECHANISM

Application filed May 23, 1930. Serial No. 456,564.

My invention relates to conveying mechanism and has a number of objects and advantages in view. In accordance with one characteristic of the invention, I provide an endless belt conveyer with a tapering throat or guideway which defines a point of departure of the load from such belt. This conveyer belt is also mounted upon a truck which is movable laterally of the conveyer to adapt the conveyer to different loading and unloading positions.

In accordance with another feature of the invention, I provide a hopper for receiving the load discharged by the conveyer, this hopper being equipped with two sections and latching mechanism which is adjustable to make either hopper section releasable while the other is maintained closed, whereby the load discharged from the hopper may be suitably distributed.

In accordance with another feature of the invention the hopper is equipped with mechanism by which it may be opened to discharge the load therefrom, this mechanism being under the control of the load that is to be discharged. This hopper is arranged longitudinally of the aforesaid endless belt conveyer and is also movable laterally of itself to adapt it to change positions of said conveyer.

I will explain my invention more fully by reference to the accompanying drawings in which Figs. 1 and 2, taken collectively and with the ends thereof in register, constitute a sectional elevation on line 1—1 of Figs. 3 and 4; Figs. 3 and 4, taken collectively and with ends thereof in register, constitute a sectional plan view taken on line 3—3 of Figs. 1 and 2; Fig. 5 is a sectional view on line 5—5 of Fig. 1; Fig. 6 is a sectional view on line 6—6 of Fig. 3; Fig. 7 is a bottom view of the left hand portion of the mechanism appearing in Fig. 3; Fig. 8 is an elevation of the structure shown in Fig. 7, with parts broken away and in section; and Fig. 9 is a sectional view on line 9—9 of Fig. 8.

And endless belt for initially receiving the load that is to be transferred desirably includes two endless sprocket chains 1 which are located abreast and which are passed about driving sprocket wheels 2 and idler sprockets 3 which are located at the other ends of the chain orbits. The driving sprocket wheels are mounted upon a shaft 4 upon which a sprocket wheel 5 is fixed, this latter sprocket wheel being driven by a sprocket chain 6 which, in turn, is driven by a sprocket pinion 7. This pinion is fixed upon a shaft 8 having a flat pulley 9 thereon. This pulley is driven by a flat belt 10 which, in turn, is driven by a flat pulley 11 on the shaft 12 of an electric motor 13. The portion of the conveyer that directly receives the load that is to be transferred is formed of slats 14, said slats being carried upon both sprocket chains 1, a link of each chain being individual to each slat and directly carrying the same, so that each slat is directly carried by two sprocket links, one in each chain. In order that the upper and lower stretches of the sprocket chains with the slats thereon may be prevented from sagging, I extend the slats laterally beyond the chains and cause the projecting ends thereof to slide upon rails 15, 16 which extend along the lines of travel of the chains. These rails are disposed between the sprocket wheels at the ends of the orbits of the chains 1. The loads may be deposited from any suitable loading platform such as an automobile truck, which in the embodiment of the invention shown, may be placed with its rear end against a wall 17 of a factory building or warehouse and in register with the window openings in such wall that may be normally closed by the horizontally slidable window sashes 18. There may be a number of such sashes that overlap where provision is made for shifting the conveyer laterally to different loading and unloading positions. Where the conveyer is thus to be shifted laterally, I provide a track 19 upon the sill of the window opening that is provided with window sashes 18 and I also provide a wheel truck 20 carrying the conveyer 1 and parts in assembly therewith and partially carried upon wheels 21 which travel on said track. These wheels are provided at the window end of the truck 20, the other end of this truck being provided with wheels 22 that turn upon a track 23 which is parallel with the track 19. For convenience the track 23 is suspended from a ceiling and is of I-beam construction enabling the employment of wheels 22 in two pairs. The wheels of each pair are journaled upon a yoke 24 having a stem 25 that connects it with the adjacent end of the truck 20.

I have illustrated a bundle 26 of metal strips as one form of load which may be transferred by the conveyer so far described. In order that the point of departure of the load from the conveyer may be determined, I provide a guideway which converges in the direction of travel of the load and which is desirably inclusive of two walls 27 which both converge at their forward ends toward the point of departure of the load from the conveyer 1. These walls thus constitute a tapering guide or throat as illustrated. They are directly anchored to the side beams of the truck 20 as indicated at 28 and are anchored, near their forward ends, to said truck beams through the intermediation of struts 29. The traveling slats 14 aid the teamster in transferring the load from his automobile truck and when the load has been sufficiently placed upon said slats, it is caught by one of the cleats 30 with which two opposite slats are provided and is propelled by such engaging cleat until the load is passed through the throat or tapering guideway defined by the walls 27. It is desirable to have the cleats coextensive in length with the slats that carry them in which event the guiding walls 27 are placed a sufficient distance above the slats to afford clearance for the cleats.

The conveying mechanism of my invention is also inclusive of a hopper into which the load portions 26 are deposited, preferably singly, this hopper being opened to discharge the load portion received thereby when this load portion has been properly placed upon the hopper. The hopper illustrated is inclusive of two sloping sections 31, 32 which are hinged upon yokes 33, as indicated at 34. The hopper sections are also hinged upon the end wall 35 of the hopper, as indicated at 36. The construction is such that preferably one or the other of the two hopper sections is alone lowered when the hopper is being emptied in order to more accurately locate the load after its discharge. After the hopper is emptied, the lowered hopper section is raised by the counterweight 37 or 38, as the case may be, assembled therewith. When the lowered hopper section is being restored to closed position by its counterweight, a latching device is operated by such counterweight to hold the restored hopper section in closed position. Where either hopper section is to be thus selectively operable and the other is to be normally stationary, I provide two latching devices, each hopper section having a latching device individual thereto. The latching device which is individual to the hopper section 31 is inclusive of a catch preferably in the form of a bar 39 which is bolted to this hopper section and, in effect, forms a continuation or part thereof that is complemental to the latching bolt 40 which is provided upon the other hopper section 32. Similarly, the latching device which is individual to the hopper section 32 is inclusive of a catch in the form of a bar 41, which is bolted to this hopper section, to be complemental to a latching bolt 42 that is provided upon the hopper section 31. Let it be assumed that the hopper section 31 is to be normally held in its closed position and that the hopper section 32 is to be alone lowered and raised in discharging and closing the hopper. To this end, the weight 37 that is individual to the hopper section 31 is moved outwardly upon its supporting arm 37' sufficiently to overcome the weight of the predetermined load 26 upon this hopper section when the latch 42 pertaining to the now operable hopper section 32 is released, whereby the hopper section 31 is maintained in its closed adjustment when the hopper section 32 is opened as well as at other times. The weight 38 pertaining to the hopper section 32 which is selected, for example, as the one which is to be opened and closed is moved sufficiently inward upon its supporting arm 38' to permit this hopper section 32 to be lowered by the load 26 when the latch bolt 42 pertaining to the hopper section 32 is withdrawn, but which weight 38 will be effective to swing this hopper section 32 to a closed position when the load has been discharged. The catch 41 on the hopper section 32 then rides over the latching bolt 42 complemental thereto and moves the same upwardly until the catch 41 escapes it, whereupon the bolt 42 will be restored to its normal position in which it engages the catch 41 and holds the hopper section 32 closed against the weight of the next load 26 and until the latch bolt 42 is again withdrawn to release this load. Due to the action of the counterweight 37 the hopper section 31 remains closed, even though the latch bolt 40 that is individual to the hopper section 31 and provided upon the hopper section 32, is bodily withdrawn from the catch 39 when this hopper section 32 is lowered. The latch bolts 40 and 42 are spring pressed toward the middle of the hopper or inwardly to normally be in catch engaging positions. Said latch bolts are desirably slidably mounted within grooves that are formed in blocks 43 carried upon the hopper sections 31 and 32, the bolts being kept in such grooves by the plates 44. Each latch bolt carries a pin 45 which is received within a slot 46 that is formed in one end of a bell crank lever 47. These bell crank levers are desirably pivoted upon the blocks 43 respectively individual thereto, as indicated at 48. A coiled spring 49 connects the other end of each bell crank lever with a post 50 which is carried upon the corresponding block 43. These springs press upon the bell cranks in directions to move the latches 40 and 42 oppositely and inwardly, so as to be in catch engaging positions. By moving the bell crank levers against the force of the springs pertaining thereto, the hopper sections may be released. When but one hopper section is to be alone released, the bell crank that pertains to its latching device is alone to be operated and the bell crank which pertains to the latching device of the hopper section that is not to be released is to remain only under the influence of its spring that holds its latching bolt in catch engaging position. Thus when the hopper section 32 is alone to be released, the bell crank 47 upon this hopper section and pertaining to the hopper section 31, remains solely under the influence of its spring 49, but the bell crank 47 upon the stationary hopper section 31 and which pertains to the hopper section 32 is to be operable against the force of its spring 49, inasmuch as this particular bell crank is in controlling relation to the latch 42 that holds the hopper section 32 closed.

In accordance with another characteristic of the invention the load 26 serves to open the hopper and to this end it is in operating relation with an actuator that is common to the bell cranks of both latching devices and shiftable into operating relation with one or the other of these bell cranks. This actuator is inclusive of a swinging member in the form of a plate 51 which is pivoted upon brackets 52 that are carried by the end wall 35. This plate or member 51 depends from its pivotal support and is engageable at its lower part by the load as this load is being pushed by the particular cleat 30 that engages it. The plate carries a depending tongue 53 having an opening through its lower end in which a pin 54 is loosely received. This pin is carried by and between the branches of the bifurcated end of the arm 55. This arm has a series of holes 56 adjacent its other end in any of which a pivot pin 57 may be received. This pivot pin may be inserted in the contiguous end of either arm 58 or 59, which are respectively pivoted upon the hopper sections 31 and 32. The arm 58, which is pivoted upon the hopper section 31, is connected by a link 60 with the bell crank 47 that is also upon this hopper section. Similarly, the arm 59, which is pivoted upon the hopper section 32, is connected by a link 61 with the bell crank 47 that is also upon this hopper. The arm 55 is connected by the pin 57 with the arm 58 or 59, in this instance the arm 58, which pertains to the latching device, in this instance the latching devices 41 and 42 that, in turn, pertains to the hopper section that is to be opened and closed, in this instance the hopper section 32. By transferring the arm 55 from its connection with the arm 58 to connection with the arm 59 and moving the weight 37 sufficiently inwardly and the weight 38 sufficiently outwardly, the hopper section 31 would be adapted for opening and closing movements, while the hopper section 32 would remain closed. The brackets 52 are provided with a series of holes 62 spaced similarly to the holes 56. The shaft 63, upon which the plate or member 51 is pivoted, is receivable in any two of these selected holes 62 to suit the length of the load 26, the pin 57 being placed in a corresponding hole 56 in the arm 55. This arrangement permits the load to clear the conveyer 1 sufficiently before it operates the hopper releasing mechanism.

The yokes 33 depend from wheels or rollers 64 that ride upon I-beam tracks 65 that are at right angles to the hopper, so that the hopper may be moved transversely of itself as the conveyer 1 is moved transversely of itself. This arrangement permits the hopper to be located over selected bins 66 to permit the loads to be discharged from the hoppers onto the bins. By holding one or the other hopper section 31, 32 closed and opening the other hopper section the part of the bin upon which the load is discharged may be selected to aid in evenly piling the load upon the bin.

Changes may be made without departing from the invention.

Having thus described my invention, I claim:

1. A V-shape hopper having two sections each being one of the sides of the V for supporting the load received by the hopper; two latching devices, one individual to each hopper section and individually controlled; and means actuated by the load whereby either latching device may be opened while the other is held closed, said means including a plate swingable on an axis transverse to the hopper, said plate having a V-shape edge depending into the hopper.

2. A hopper having two sections for supporting the load received by the hopper; two latching devices, one individual to each hopper section, the latching device pertaining to each hopper section including a catch upon this hopper section and a latch complemental to such catch and carried by the other hopper section; and means actuated by the load, whereby either latching device may be open while the other is held closed.

3. A hopper having two sections for supporting the load received by the hopper; two latching devices, one individual to each hopper section, the latching device pertaining to each hopper section including a catch upon this hopper section and a latch complemental to such catch and carried by the other hopper section; and a bell crank in controlling relation to each latch and spring pressed in a direction normally to place such latch in a catch engaging position.

4. A hopper having two sections for supporting the load received by the hopper; two latching devices, one individual to each hopper section, the latching device pertaining to each hopper section including a catch upon this hopper section and a latch complemental to such catch and carried by the other hopper section; a bell crank in controlling relation to each latch and spring pressed in a direction normally to place such latch in a catch engaging position; and an actuator operable by the load in the hopper and provided with means whereby it may be interchangeably coupled with said bell cranks.

5. A hopper having two sections for supporting the load received by the hopper; two latching devices, one individual to each hopper section, the latching device pertaining to each hopper section including a catch upon this hopper section and a latch complemental to such catch and carried by the other hopper section; a bell crank in controlling relation to each latch and spring pressed in a direction normally to place such latch in a catch engaging position; two arms, one pivoted upon each hopper section and linked to the bell crank upon the same section; and an actuator operable by the load in the hopper and provided with means whereby it may be interchangeably coupled with said arms.

6. A hopper having two sections for supporting the load received by the hopper; two latching devices, one individual to each hopper section, the latching device pertaining to each hopper section including a catch upon this hopper section and a latch complemental to such catch and carried by the other hopper section; a bell crank in controlling relation to each latch and spring pressed in a direction normally to place such latch in a catch engaging position; an actuator operable by the load in the hopper and provided with means whereby it may be interchangeably coupled with said bell cranks; and adjustable counterweights, one upon each hopper section.

7. A hopper having two sections for supporting the load received by the hopper; two latching devices, one individual to each hopper section, the latching device pertaining to each hopper section including a catch upon this hopper section and a latch complemental to such catch and carried by the other hopper section; a bell crank in controlling relation to each latch and spring pressed in a direction normally to place such latch in a catch engaging position; two arms, one pivoted upon each hopper section and linked to the bell crank upon the same section; an actuator operable by the load in the hopper and provided with means whereby it may be interchangeably coupled with said arms; and adjustable counterweights, one upon each hopper section.

8. A hopper having a non-releasable load supporting portion and a releasable load supporting portion; mechanism carried by the non-releasable portion for holding this releasable load supporting portion closed; and means in releasing relation to said mechanism and operable by the load in the hopper.

9. A hopper having a non-releasable load supporting portion and a releasable load supporting portion; a latch carried by the non-releasable portion for holding this releasable load supporting portion closed; and means in releasing relation to said latch and operable by the load in the hopper.

10. The structure of claim 8 wherein the means in releasing relation to the holding mechanism is inclusive of a swinging member adapted to be swung by the load when moved to a predetermined extent along the hopper.

11. The structure of claim 9 wherein the load operated means is inclusive of a swinging member adapted to be swung by the load when moved to a predetermined extent along the hopper.

12. The structure of claim 8 wherein the means in releasing relation to the holding mechanism is inclusive of a movable member adapted to be moved by the load when moved to a predetermined extent in the hopper.

13. The structure of claim 9 wherein the load operated means is inclusive of a movable member adapted to be moved by the load when moved to a predetermined extent in the hopper.

14. A hopper comprising, in combination, two downwardly sloping sections meeting along their lower edge; two latching devices one individual to each section for holding the sections together to support the load, the latching device for each section being carried by the other section; an adjustable counterweight individual to each section for maintaining either section closed against the weight of the load; and mechanism actuated by the load for releasing the other section to deposit the load, said releasable section being movable to closed position by its counterweight after the load is deposited.

In witness whereof, I hereunto subscribe my name.

WILLIAM E. WUNDERLICH.